United States Patent
Nowak et al.

(10) Patent No.: US 12,536,308 B2
(45) Date of Patent: Jan. 27, 2026

(54) SYSTEMS AND METHODS FOR DETECTING SENSITIVE INFORMATION EXPOSURE

(71) Applicant: Capital One Services, LLC, McLean, VA (US)

(72) Inventors: Matthew Louis Nowak, Midlothian, VA (US); Michael Anthony Young, Jr., Henrico, VA (US); Christopher McDaniel, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 433 days.

(21) Appl. No.: 18/325,977

(22) Filed: May 30, 2023

(65) Prior Publication Data

US 2024/0403450 A1 Dec. 5, 2024

(51) Int. Cl.
*G06F 21/60* (2013.01)
*G06F 21/62* (2013.01)

(52) U.S. Cl.
CPC ........ *G06F 21/604* (2013.01); *G06F 21/6218* (2013.01); *G06F 2221/2101* (2013.01); *G06F 2221/2141* (2013.01)

(58) Field of Classification Search
CPC . G06F 21/604; G06F 21/6218; G06F 21/6245
See application file for complete search history.

(56) References Cited

U.S. PATENT DOCUMENTS

| | | | |
|---|---|---|---|
| 2009/0013267 A1* | 1/2009 | Cudich | G06F 40/143 715/762 |
| 2018/0285590 A1* | 10/2018 | Cosson | G06Q 10/083 |
| 2020/0235933 A1* | 7/2020 | Redkokashin | G06Q 50/01 |
| 2020/0293683 A1* | 9/2020 | Scuderi | G06F 21/84 |
| 2024/0056486 A1* | 2/2024 | Lowenhardt | H04L 41/16 |

* cited by examiner

*Primary Examiner* — Matthew T Henning
(74) *Attorney, Agent, or Firm* — Foley & Lardner LLP

(57) ABSTRACT

Methods and systems to detect and manage access to sensitive information. The system retrieves a dataset of entitlements for a plurality of users. The dataset of entitlements specifies one or more respective exposure vectors. The system detects a triggering event, including a release of sensitive information to a first subset of users of the plurality of users via a first exposure vector. The system then determines a second subset of users of the plurality of users that have access to the first exposure vector based on a comparison of the first exposure vector to the dataset of entitlements. The system monitors electronic communications of the second subset of users for activity related to the sensitive information to detect first activity of a first user of the second subset of users. The system generates for display a first notification to a second user based on detecting the first activity.

20 Claims, 4 Drawing Sheets

SYSTEMS AND METHODS FOR DETECTING SENSITIVE INFORMATION EXPOSURE

BACKGROUND

As electronic communication becomes increasingly prevalent, and organizations become increasingly complex, sensitive information is more likely than ever to be accessed by users who are not its intended recipients. Undesirable access to sensitive information can pose security risks and may cause additional liabilities. Current systems for the detection of exposures of sensitive information to unauthorized users have several shortcomings.

SUMMARY

Methods and systems are described herein for improvements to the automatic detection of exposures of sensitive information to unauthorized users. For example, existing systems for the automatic detection of exposures of sensitive information to unauthorized users are inflexible and inefficient. These existing systems are inflexible and inefficient because they rely on invariable protocols for managing types of sensitive information leaks that are not tailored to the specific circumstances of the leak. These systems are not tailored to the specific circumstances of the leak because there is no methodology for encoding risks of leaks or the circumstances that result in leaks. The reason for this is the difficulty or impossibility to encode whether or not different users actually accessed the sensitive information.

To overcome this technical deficiency, methods and systems disclosed herein provide a novel method for encoding risks of leaks and/or the circumstances that result in leaks as well as a novel method for estimating the probability and severity of a leak if it occurs. In particular, the methods and systems recite the use of parallel processing of triggering events based on exposure vectors of information released to authorized users.

For example, because it is difficult or impossible to encode whether or not different users actually accessed the sensitive information, the systems and methods encode risks of leaks and/or the circumstances that result in leaks as a function of subsets of users that have access to an exposure vector of sensitive information. That is, the system uses a first process (e.g., of the parallel process) to determine which users may have had access to the same exposure vector in which sensitive information was exposed, as opposed to attempting to directly encode whether or not different subsets of users had access to the sensitive information itself.

The system then uses a second process (e.g., done in parallel to the first) to estimate the probability and severity of a leak if it occurs. For example, even encoding risks of leaks and/or the circumstances that resulted in leaks as the function of subsets of users that had access to an exposure vector of the sensitive information does not guarantee that these subsets of users actually accessed the sensitive information. Because of this, the methods and systems further confirm this (through the second process) by monitoring the subset of users for activity related to the sensitive information. These parallel processes based on the single triggering event allow for improved detection of exposures of sensitive information to unauthorized users.

In some aspects, a method is herein disclosed for automatically detecting exposures of sensitive information to unauthorized users based on exposure vectors of information released to authorized users. The method comprises retrieving a dataset of entitlements for a plurality of users, wherein the dataset of entitlements specifies one or more respective exposure vectors, detecting a triggering event, wherein the triggering event comprises a release of sensitive information to a first subset of users of the plurality of users via a first exposure vector, and in response to detecting the triggering event: determining a second subset of users of the plurality of users that have access to the first exposure vector based on a comparison of the first exposure vector to the dataset of entitlements and monitoring electronic communications of the second subset of users for activity related to the sensitive information, based on monitoring the electronic communications, detecting first activity of a first user of the second subset of users that is related to the sensitive information, and generating for display, on a user interface, a first notification to a second user based on detecting the first activity.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
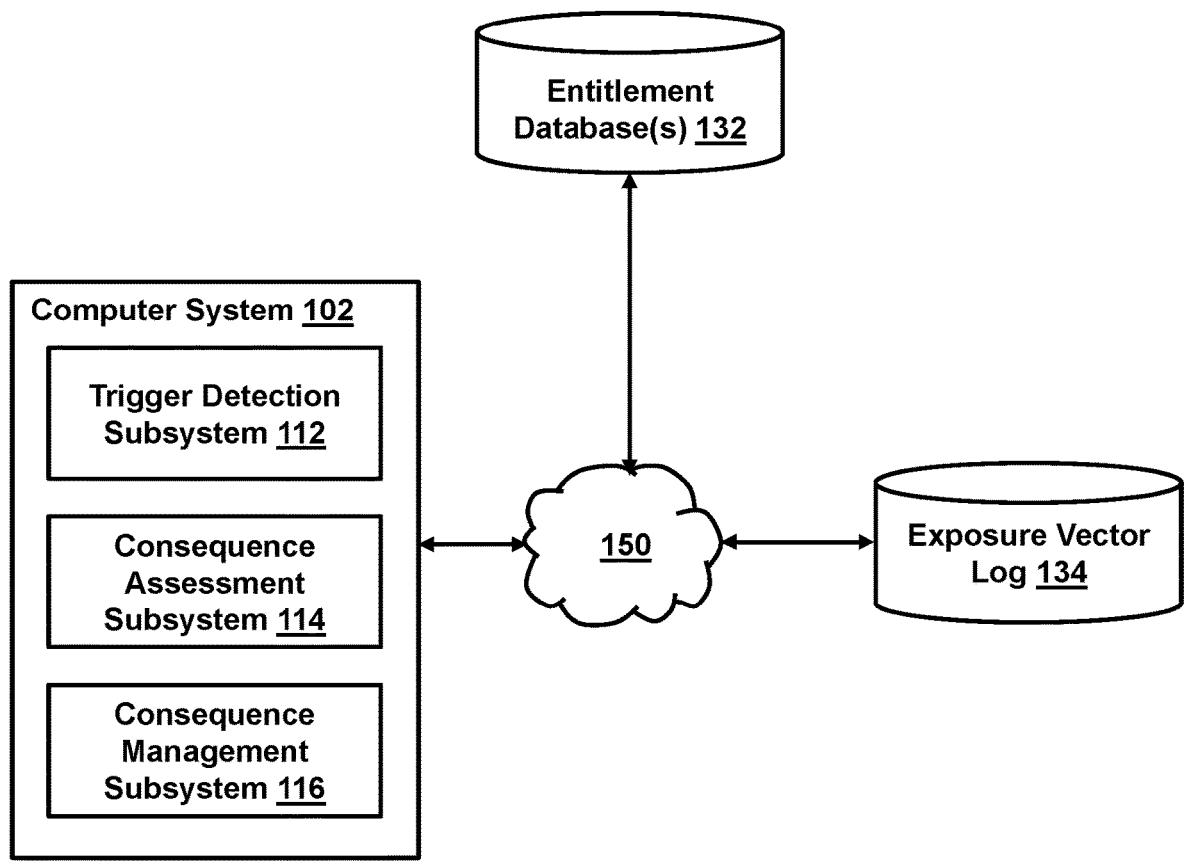
FIG. 1 shows an illustrative diagram for detecting, assessing, and responding to access to sensitive information, in accordance with one or more embodiments.

FIG. 1 shows an illustrative diagram for system 150, a computer system for detecting, assessing, and responding to access to sensitive information, in accordance with one or more embodiments. For example, system 150 (the system) includes Computer System 102, Entitlement Database(s) 132, and Exposure Vector Log 134.

The system may access and maintain Entitlement Database(s) 132. Entitlement Database(s) 132 contains an index of users and a plurality of exposure vectors corresponding to the index of users. Entitlement Database(s) 132 may specify what locations, data, software, hardware, computer networks, or systems each user has access to. In addition, the exposure vectors corresponding to each user in Entitlement Database(s) 132 may indicate possibilities where the user accesses information they were not permitted to access and the corresponding consequences. In some embodiments, each exposure vector may be associated with a numerical score indicating a severity of the consequences of such improper access.

The system may use exposure vectors and user activity logs to identify possible information leakage points. For example, Consequence Assessment Subsystem 114 uses a machine learning model which uses exposure vectors and user activity logs to analyze a probability that such information leakage is problematic, and determines the scope of negative consequences the information leakage can lead to. Accordingly, the methods and systems respond to possible leakages of sensitive information comprehensively, accurately, and speedily.

Computer System 102 includes Trigger Detection Subsystem 112, Consequence Assessment Subsystem 114, and Consequence Management Subsystem 116.

Trigger Detection Subsystem 112 may receive notifications (e.g., from an internal computer network) of possible triggering events. Triggering events may release sensitive information to a first subset of users of the plurality of users through one or more locations, data, software, hardware, computer networks, or systems. The first subset of users may have a right to the sensitive information, e.g., their entitlements include access to such information. A triggering event may also release the sensitive information to a second subset of users, who may not have a right to the sensitive information. The triggering event may be caused by compromised security in the software or hardware of a computer system, a physical location, or an accidental release of data. Trigger Detection Subsystem 112 may receive a notification describing locations, data, software, hardware, computer networks, or systems which were compromised in relation to the triggering event. The notification may indicate one or more users in the first subset of users, and may include a description for the sensitive information. In some embodiments, the notification may instead include descriptions of the nature and extent of the release of sensitive information. For example, a dataset may be leaked from a first computing cluster via an internal network to a second computing cluster, where the second computing cluster should not have access to the dataset. Trigger Detection Subsystem 112 may receive a notification containing a copy of the dataset, the internal network which transmitted the dataset, and an identification of the first computing cluster. In some embodiments, Trigger Detection Subsystem 112 may also retrieve a location-based entitlement log and/or a time-based entitlement log detailing which entitlements were used at specific locations or times, respectively. Trigger Detection Subsystem 112 may provide such entitlement logs to Consequence Assessment Subsystem 114 to identify a second subset of users.

In some embodiments, Trigger Detection Subsystem 112 may receive detect a triggering event during a routine check on one or more locations, data, software, hardware, computer networks, or systems. The triggering event may affect a first subset of users and a second subset of users. In some embodiments, Trigger Detection Subsystem 112 may generate a risk dataset in relation to the first subset of users and/or the second subset of users. The second subset of users may be selected as described above, or they may be selected by Consequence Assessment Subsystem 114. The risk dataset may include, for example, exposure vectors for one or more users in the first or second subsets of users. Additionally, the risk dataset may include data generated or managed by users in the first or second subsets (i.e., exposed data). Exposed data may include real-valued entries in one or more data tables, plain text, written or electronic communications, or software source code, among other types of data. The risk dataset may additionally include metadata for the exposed data, for example, the features and variables used in the exposed data, APIs and databases related to the exposed data, text descriptions of the exposed data, computer systems where the exposed data is stored, or software programs which access the exposed data.

Trigger Detection Subsystem 112 may generate a first exposure vector corresponding to the triggering event using the notification. Trigger Detection Subsystem 112 may select certain features to extract from the notification, and translate data and descriptions in the notification into values for those features. For example, in the above example, Trigger Detection Subsystem 112 may create an exposure vector indicating that the sensitive information was a dataset (e.g., captured with a categorical variable in the exposure vector), a numerical representation of the size of the dataset (e.g., the number of entries in the dataset), and contained links to the computing cluster. In some embodiments, Trigger Detection Subsystem 112 may browse Entitlement Database(s) 132 to retrieve a plurality of exposure vectors corresponding to the first subset of users.

Consequence Assessment Subsystem 114 may identify a second subset of users, as the second subset is not necessarily identified by the notification received by Trigger Detection Subsystem 112 or the first exposure vector. To identify a second subset of users, Consequence Assessment Subsystem 114 may, in some embodiments, determine a sensitivity level of the sensitive information to compare the sensitivity level against entitlement levels of users and/or determine probabilities of exposure for users. Consequence Assessment Subsystem 114 may identify the second subset of users as the first process in a parallel pair of processes, the second process being estimating the probability that inappropriate access to sensitive information actually occurred. The parallel processes may be executed simultaneously.

In some embodiments, as part of the first process of the parallel processes, Consequence Assessment Subsystem 114 may select a subset of exposed users by comparing the first exposure vector against the vectors in Entitlement Database(s) 132, which represent users. For example, Consequence Assessment Subsystem 114 may scan for exact matches in categorical variables between the first exposure vector and one or more vectors in Entitlement Database(s) 132. Additionally, Consequence Assessment Subsystem 114 may select vectors whose quantitative variables fall within a set range of the values in the first exposure vector. Such quantitative variables may, for example, indicate geographical proximity to the release of sensitive information. Consequence Assessment Subsystem 114 may select vectors that sufficiently match the first exposure vector to comprise a subset of exposed users. In some embodiments, as part of the first process of the parallel processes Consequence Assessment Subsystem 114 may further select users from the subset of exposed users to form the second subset of users, to whom monitoring and lockdown may be applied.

In some embodiments, as part of the second process of the parallel processes, Consequence Assessment Subsystem 114 may compare the first exposure vector to a list of past triggering events (e.g., Exposure Vector Log 134) to generate a measure of importance. For example, Consequence Assessment Subsystem 114 may use a comparative model to rank the first exposure vector among a plurality of prior exposure vectors in Exposure Vector Log 134 as a percentile using one or more features. The percentile in those features may constitute the measure of importance. In another example, Consequence Assessment Subsystem 114 may use a clustering model to compute a distance from the first exposure vector to a plurality of prior exposure vectors in Exposure Vector Log 134, and the distance may constitute the measure of importance. Consequence Assessment Subsystem 114 may determine a sensitivity level based on the measure of importance. Sensitivity levels may be preset and may trigger protocols for managing the exposure of sensitive information. For example, a leakage of confidential data with a sensitivity level of category I may require more stringent lockdown measures than a similar data leak of category III. Consequence Assessment Subsystem 114 may select a filtering level of the plurality of users based on the sensitivity level. For example, for a data leak of category I, all parties with access to the corporation's computer network must be alerted and a lockdown may be put on certain types of communication. For a data leak of category III, only a few engineers on an internal network may be alerted or monitored. Consequence Assessment Subsystem 114 may filter the plurality of users based on comparing respective entitlements for each of the plurality of users in the dataset of entitlements to the filtering level. A second subset of users eligible for further monitoring and control may be selected only from the filtered users.

In some embodiments, as part of the second process of the parallel processes, Consequence Assessment Subsystem 114 may estimate a probability that a second subset of users accessed the sensitive information and a degree of severity in case such access occurred. To do so, Consequence Assessment Subsystem 114 may use an exposure estimation model, which may be a machine learning model using algorithms such as linear regression, logistic regression, or random forest methods. The exposure estimation model may take as input the first exposure vector, exposure vectors corresponding to a second subset of users, exposure vectors corresponding to past triggering events, and a location-based entitlement usage log, or a time-based entitlement usage log. In some embodiments, the exposure estimation model also takes as input the measure of importance and the severity level. In some embodiments, the output of the exposure estimation model may contain a probability that a second subset of users accessed the sensitive information. In other embodiments, the output of the exposure estimation model may contain a vector describing both a probability that a second subset of users accessed the sensitive information and a degree of severity of such access. The probability may be represented as a real value between 0 and 1, and the degree of severity may be a real value or a vector of values.

In some embodiments, as part of the second process of the parallel processes, Consequence Assessment Subsystem 114 may use natural language processing to determine the degree of severity relating to access to sensitive information. For example, Consequence Assessment Subsystem 114 may use a machine learning model to process the risk dataset to generate a severity score. The machine learning model may use an algorithm such as decision trees to process exposed data and associated metadata to generate a severity score corresponding to the degree of severity in case of unauthorized access to the exposed data. In some embodiments, the machine learning model may also output a label using a classification algorithm, the label indicating a type of negative consequence relating to unauthorized access to the exposed data. Consequence Assessment Subsystem 114 may transmit the severity score and the label in relation to the exposed data to Consequence Management Subsystem 116 for further processing.

Consequence Management Subsystem 116 may apply lockdown and monitoring to one or more of the plurality of users in the locations, data, software, hardware, computer networks, or systems described in Entitlement Database(s) 132. The lockdown and monitoring may be applied simultaneously as or subsequently to the estimations of probability and severity by Consequence Assessment Subsystem 114 and may constitute the second process of the parallel processes. To apply monitoring to a system or line of communication, Consequence Management Subsystem 116 may censor activities performed on the system or information sent and/or received on the line of communication. For example, Consequence Management Subsystem 116 may record the running of certain software on a system, or the use of a system to access certain databases in relation to a triggering event. For example, Consequence Management Subsystem 116 may search incoming or outgoing messages in an email system for certain keywords in relation to a triggering event. In some embodiments, in response to detecting keywords in a message or access to a database, the system may impose lockdown measures corresponding to the degree of severity determined by Consequence Assessment Subsystem 114. For example, Consequence Management Subsystem 116 may detect access to a database on a device, the database corresponding to the triggering event. In response, Consequence Management Subsystem 116 may shut down access to the database from all sources. In addition, the device may be prevented from accessing other databases for a period of time. The scope of other databases denied to the device, and the length of time of the lockout, may correspond to the degree of severity determined by Consequence Assessment Subsystem 114. Consequence Management Subsystem 116 may achieve monitoring and/or lockdown using one or more cybersecurity methods such as invalidating security credentials of users, software, hardware, computer networks, or systems. Consequence Management Subsystem 116 may remove exposed data from a computer system or cloud computing system for additional security. Consequence Management Subsystem 116 may implement one or more preprogrammed data protection measures. Consequence Management Subsystem 116 may also alert one or more users for manual intervention for the protection of exposed data.

In some embodiments, as part of the second process of the parallel processes, Consequence Management Subsystem 116 may use a model to determine a length of time during which to apply lockdown and monitoring. The model may take as input the first exposure vector, exposure vectors corresponding to a second subset of users, exposure vectors corresponding to past triggering events, and the measure of importance and severity level of the triggering event. This model may be a machine learning model using algorithms such as linear regression, logistic regression, or random forest methods. Alternatively, the model may use a clustering algorithm which compares the exposure vector corresponding to the current triggering event to those corresponding to past triggering events. The system may use an algorithm such as K-nearest neighbors to select comparable triggering events and take a weighted average of the lengths of time for lockdown and monitoring.

In some embodiments, Consequence Management Subsystem 116 may flag users, locations, data, software, hardware, computer networks, or systems as compromised such that preventive measures may be taken when such users, locations, data, software, hardware, computer networks, or systems attempt or are made to attempt certain actions. For example, an email address on an internal network may be the subject of a hack. The Consequence Management Subsystem 116 may flag the email address as compromised and issue a warning to other devices and systems on the internal network to be alert of the possible danger of messages from the compromised email address. In another example, a piece of software may be compromised, but a full lockdown of the software is not warranted by the degree of severity determined by Consequence Assessment Subsystem 114. Therefore, Consequence Management Subsystem 116 may issue a warning to one or more users whose exposure vectors contain the piece of software. In addition, Consequence Management Subsystem 116 may place a preliminary hold on the piece of software such that when a user attempts to use the piece of software they are first met with a warning page.

Figure 2:
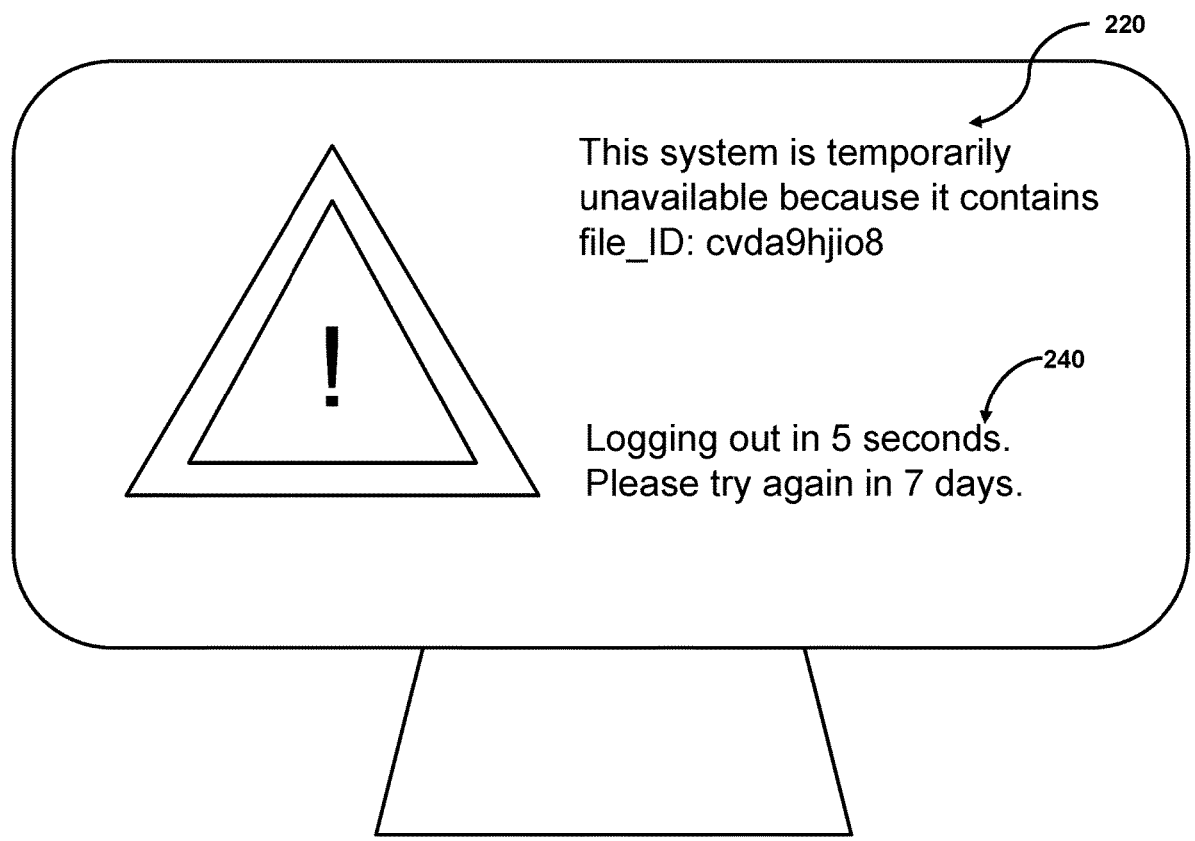
FIG. 2 shows an illustrative diagram for a user interface for notifying users of lockdown measures, in accordance with one or more embodiments.

FIG. 2 shows an illustrative diagram for a user interface displaying a notification to a user locking the user out of a system, in accordance with one or more embodiments. The user interface is for a computing device. Such a computing device may be subject to monitoring and lockdown by Consequence Management Subsystem 116, for example, in response to a sensitive information leakage. The user interface in FIG. 2 may be displayed in response to a user attempting to log into the computing device. In some embodiments, the user and/or the computing device may have been flagged by Consequence Management Subsystem 116 as compromised.

The user interface of FIG. 2 may contain one or more error messages, e.g., message 220 and message 240. The error message may contain one or more parameters used to determine locking a user out of a computing device, system, hardware, or software. Message 220 specifies that the computing device is unavailable. Additionally, it points out that sensitive information has been leaked. The file_ID allows the user to know which other systems are also unavailable. In some embodiments, message 220 may be displayed simultaneously as the computing device denies an action or service to the user. For example, the computing device may deny a login request after determining that the login credentials have been flagged as compromised. In another example, a user attempting to trade a stock may be ejected from the trading platform due to a stock-trading suspension they may be under.

Message 240 indicates that the user is locked out of the system and specifies an amount of time during which the user is kept out. For example, the system may determine that a lockdown period appropriate for a user with such entitlements is 7 days. Consequence Assessment Subsystem 114 may determine this lockdown period using the sensitivity level of the sensitive information leakage. In some embodiments, the lockdown period may be dynamically adjusted in response to receiving a second exposure vector corresponding to the triggering event.

Figure 3:
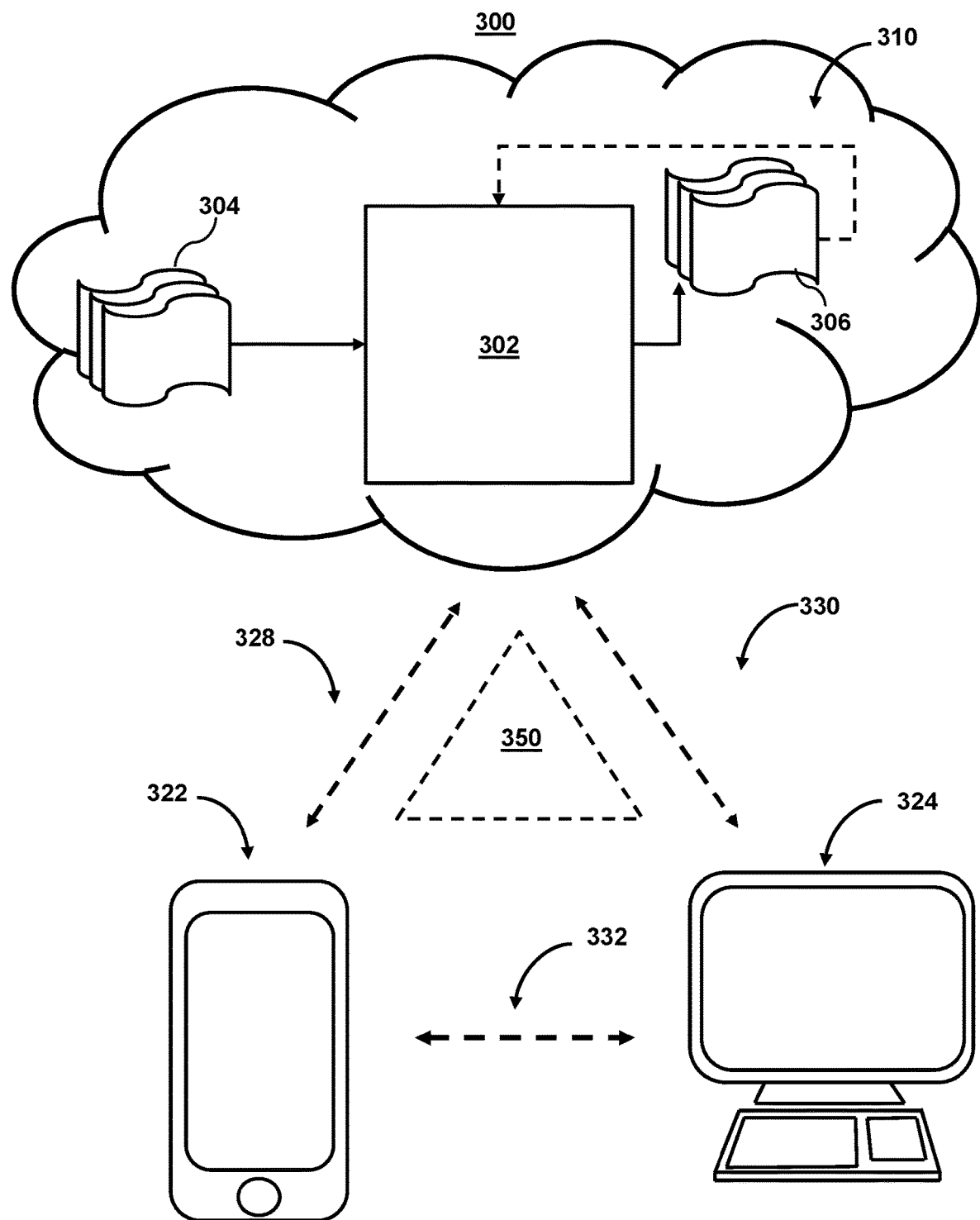
FIG. 3 shows illustrative components for a system used to detect, assess, and respond to access to sensitive information, in accordance with one or more embodiments.

FIG. 3 shows illustrative components for a system used to detect, assess, and respond to access to sensitive information, in accordance with one or more embodiments. For example, FIG. 3 may show illustrative components which may retrieve exposure vectors, train models, and invalidate security credentials. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include Computer System 102 in FIG. 1.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., using an exposure estimation model to calculate a probability the sensitive information has been accessed).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem-solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., K-nearest neighbors clustering to identify triggering events similar to a particular triggering event).

In some embodiments, the model (e.g., model 302) may automatically perform actions based on outputs 306. In some embodiments, the model (e.g., model 302) may not perform any actions. The output of the model (e.g., model 302) may be used to determine a probability that the sensitive information has been accessed.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of the API layer 350 may provide integration between front end and back end. In such cases, API layer 350 may use RESTful APIs (exposition to front end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
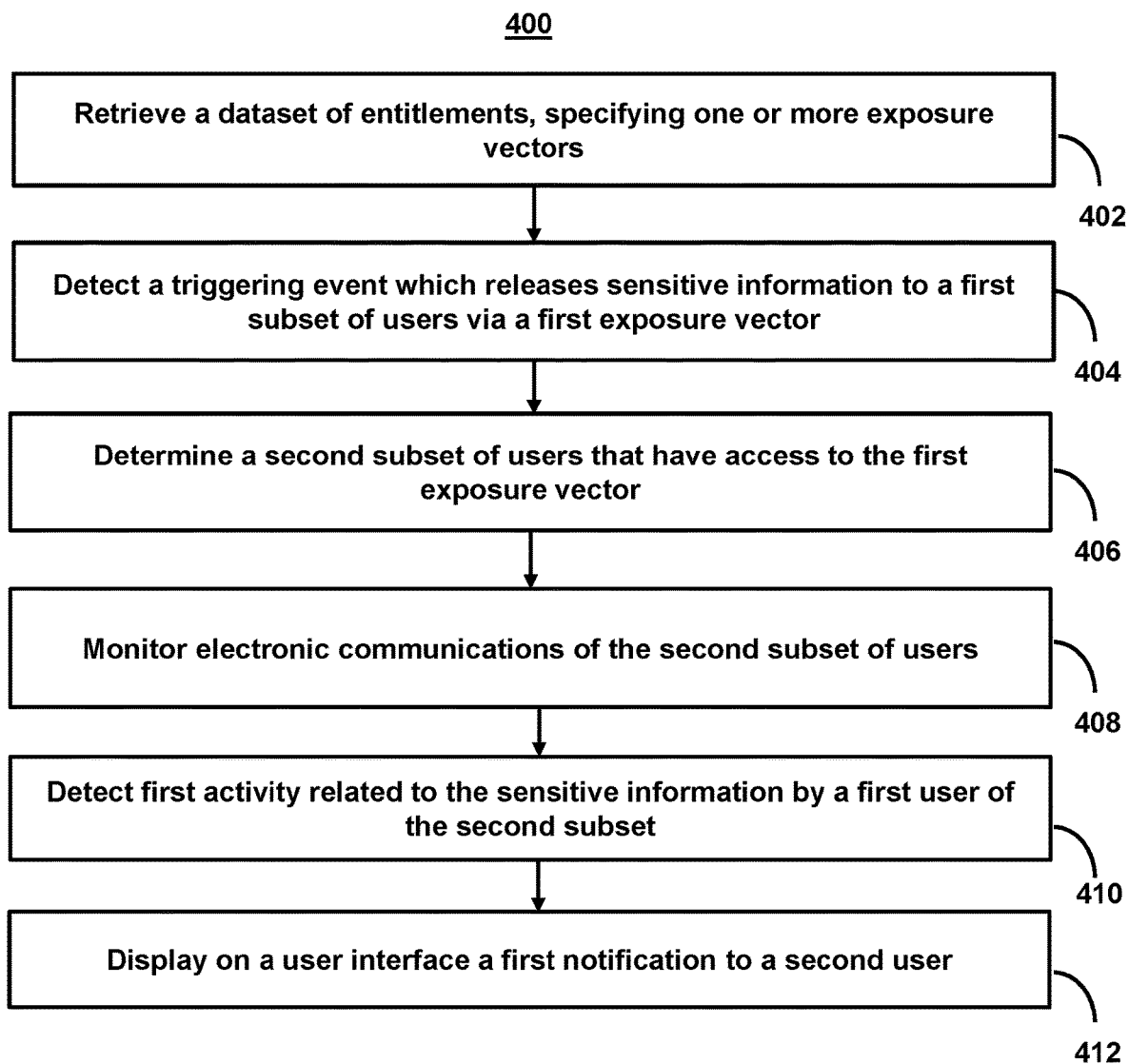
FIG. 4 shows a flowchart of the steps involved in detecting, assessing, and responding to access to sensitive information, in accordance with one or more embodiments.

FIG. 4 shows a flowchart of the steps involved in detecting, assessing, and responding to access to sensitive information, in accordance with one or more embodiments. For example, the system may use process 400 (e.g., as implemented on one or more system components described above) in order to detect a triggering event, calculate a probability that users accessed sensitive information inappropriately, determine a consequence of such inappropriate access, and manage the consequence.

At step 402, process 400 (e.g., using one or more components described above) retrieves a dataset of entitlements for a plurality of users, wherein the dataset of entitlements specifies one or more respective exposure vectors. The dataset of entitlements (e.g., Entitlement Database(s) 132) may specify what locations, data, software, hardware, computer networks, or systems each user has access to (i.e., their entitlements). For example, a user's position on a board of directors for a corporation grants them access to privileged reports, and attendance to decision-making conferences, as well as much information about the corporation's business not commonly available. This user's access to such information and their decision-making capacities create limitations on actions of the user, like trading the corporation's stock. Thus, the system may generate exposure vectors corresponding to each user in the plurality of users by correlating locations, data, software, hardware, computer networks, or systems within the entitlements of a user to potential consequences of improper usage of one or more of the locations, data, software, hardware, computer networks, or systems. For example, if the user in the above example traded in the stock of the corporation shortly after a board meeting discussing decisions, that would create economic and regulatory liabilities for the corporation, among other possible consequences. In some embodiments, the system may calculate a severity score corresponding to the improper usage of a user's entitlements, and the severity score may be stored corresponding to the exposure vector of that user.

At step 404, process 400 (e.g., using one or more components described above) detects a triggering event, wherein the triggering event comprises a release of sensitive information to a first subset of users of the plurality of users via a first exposure vector. A triggering event may also release the sensitive information to a second subset of users, who are not authorized to access such information. For example, Trigger Detection Subsystem 112 may receive a notification describing locations, data, software, hardware, computer networks, or systems which were compromised. For example, the contents of a board meeting (i.e., the sensitive information being released to the first subset) may have been accidentally overheard by a group of engineers (the second subset) meeting in an adjacent room. Further, suppose that a transcript of the board meeting has been accidentally circulated via email among a broader team of engineers alongside the transcript of the engineers' meeting. Trigger Detection Subsystem 112 may, in this example, receive a notification indicating the two rooms where the meetings took place, the nature of the information presumably discussed at the board meeting, the transcript of the board meeting, the email network of the team of engineers who received a copy of the transcript, and the list of names for that team of engineers. This information may be received by Trigger Detection Subsystem 112 as one or more descriptions about the extent and nature of the release of sensitive information. Trigger Detection Subsystem 112 may generate a first exposure vector corresponding to the triggering event. The exposure vector may specify locations, data, software, hardware, computer networks, or systems which were compromised.

In some embodiments, Consequence Assessment Subsystem 114 may determine a probability, for the users who took part in user activities at the location described in the notification, that said users used the entitlement corresponding to the first exposure vector. Consequence Assessment Subsystem 114 may train and use an exposure estimation model to determine the probability.

In some embodiments, Consequence Assessment Subsystem 114 may compare the first exposure vector to a list of past triggering events (e.g., Exposure Vector Log 134) to generate a measure of importance. For example, Consequence Assessment Subsystem 114 may use a comparative model to rank the first exposure vector among a plurality of prior exposure vectors in Exposure Vector Log 134 as a percentile using one or more features. The percentile in those features may constitute the measure of importance. In another example, Consequence Assessment Subsystem 114 may use a clustering model to compute a distance from the first exposure vector to a plurality of prior exposure vectors in Exposure Vector Log 134, and the distance may constitute the measure of importance. Consequence Assessment Subsystem 114 may determine a sensitivity level based on the measure of importance. Sensitivity levels may be selected from a predetermined list and may be used to trigger protocols for managing the exposure of sensitive information. For example, a leakage of confidential data with a sensitivity level of category I may require more stringent lockdown measures than a similar data leak of category III. Consequence Assessment Subsystem 114 may select a filtering level for the plurality of users based on the sensitivity level. For example, for a data leak of category I, all parties with access to the corporation's computer network must be alerted and a lockdown may be put on certain types of communication. For a data leak of category III, only a few engineers on an internal network may be alerted or monitored. Consequence Assessment Subsystem 114 may filter the plurality of users based on comparing respective entitlements for each of the plurality of users in the dataset of entitlements to the filtering level. A second subset of users eligible for further monitoring and control may be selected only from the filtered users.

At step 406, process 400 (e.g., using one or more components described above) determines a second subset of users of the plurality of users that have access to the first exposure vector based on a comparison of the first exposure vector to the dataset of entitlements, in response to detecting the triggering event. Consequence Assessment Subsystem 114 may, using the first exposure vector, determine a location of the release of the sensitive information. Consequence Assessment Subsystem 114 may retrieve a location-based entitlement usage log, comprising a record of user activity for one or more users in the plurality of users, and, using the location-based entitlement usage log, determine users who took part in user activities at the location. For example, the location-based entitlement usage log may indicate that a group of employees booked a conference room during a period of time. The conference room may be adjacent to a board meeting where sensitive information was released. In another example, the system may, using the first exposure vector, determine a time of the release of the sensitive information. The system may retrieve a time-based entitlement usage log, comprising a record of user activity for one or more users in the plurality of users and, using the time-based entitlement usage log, determine users who took part in user activities at the time. In some embodiments, Consequence Assessment Subsystem 114 may retrieve a plurality of exposure vectors from Entitlement Database(s) 132 corresponding to, e.g., the second subset of users, and compare the first exposure vector against the plurality of exposure vectors. This allows the system to identify individuals to whom lockdowns and monitoring may be applied.

In some embodiments, Consequence Assessment Subsystem 114 may determine a probability that users used the entitlement corresponding to the first exposure vector, as described above. Consequence Assessment Subsystem 114 may compare this probability against a threshold probability to determine whether further monitoring and control are necessary. In some embodiments, the threshold probability may correspond to the sensitivity level of the sensitive information released in the triggering event. For example, Consequence Assessment Subsystem 114 may determine the probability of entitlements being used in relation to the data leakage to be 60%, but the sensitivity level of the sensitive information may require a 75% probability of improper access for monitoring and control. Consequence Assessment Subsystem 114 may thus determine that no lockdown period is necessary. In another example, Consequence Assessment Subsystem 114 may determine the probability of entitlements being used in relation to the data leakage to be 80% when the threshold probability is 30%. Consequently, Consequence Assessment Subsystem 114 may determine a lockdown period corresponding to the sensitivity level, e.g., 7 days, during which Consequence Management Subsystem 116 may place a temporary restriction on certain communications and actions of the second subset of users.

At step 408, process 400 (e.g., using one or more components described above) monitors electronic communications of the second subset of users for activity related to the sensitive information. To do so, the system may select a monitoring time. In some embodiments, the monitoring time may be selected based on the sensitivity level of the sensitive information described above. For example, one data leak might call for a five-day alert period, while a denial-of-service attack on the computer network may cause Consequence Management Subsystem 116 to lock down the computer network for two weeks. In the former instance, Consequence Management Subsystem 116 may issue warnings to all computers on a network. In the latter instance, Consequence Management Subsystem 116 may shut off access to certain nodes of the computer network, e.g., certain computers completely for two weeks.

At step 410, process 400 (e.g., using one or more components described above), based on monitoring the electronic communications, detects a first activity of a first user of the second subset of users that is related to the sensitive information. For example, Consequence Management Subsystem 116 may have imposed a ban on trading stocks and securities for the second subset of users of a company's internal network following the leakage of confidential information. Consequence Management Subsystem 116 may subsequently detect that the first user, who is subject to the ban, is attempting to log in to a trading platform. Consequence Management Subsystem 116 may detect this through the login credentials of the first user, which it may be monitoring because the first user has been flagged as compromised.

At step 412, process 400 (e.g., using one or more components described above) generates for display, on a user interface, a first notification to a second user based on detecting the first activity. Consequence Management Subsystem 116 may cause to be displayed, to the first user on a first device, a warning to exit the trading platform and to not make trades in stocks or securities for a specified period of time. The warning and/or the length of the period of time may be tailored to the first user and may depend on the sensitivity level of the triggering event. Consequence Management Subsystem 116 may also lock down the trading platform for the first user's login credentials to prevent trading.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: retrieving a dataset of entitlements for a plurality of users, wherein the dataset of entitlements specifies one or more respective exposure vectors; detecting a triggering event, wherein the triggering event comprises a release of sensitive information to a first subset of users of the plurality of users via a first exposure vector; in response to detecting the triggering event: determining a second subset of users of the plurality of users that have access to the first exposure vector based on a comparison of the first exposure vector to the dataset of entitlements; and monitoring electronic communications of the second subset of users for activity related to the sensitive information; based on monitoring the electronic communications, detecting first activity of a first user of the second subset of users that is related to the sensitive information; and generating for display, on a user interface, a first notification to a second user based on detecting the first activity.
2. The method of any one of the preceding embodiments, wherein: the dataset of entitlements specifies what locations, data, software, hardware, computer networks, or systems each user has access to; and exposure vectors are generated corresponding to each user in the plurality of users by correlating locations, data, software, hardware, computer networks, or systems within the entitlements of a user to potential consequences of improper usage of one or more of the locations, data, software, hardware, computer networks, or systems.
3. The method of any one of the preceding embodiments, wherein detecting the triggering event comprises: receiving a second notification describing locations, data, software, hardware, computer networks, or systems which were compromised; receiving one or more descriptions about the extent and nature of the release of sensitive information; and using the second notification and the one or more descriptions, generating a first exposure vector corresponding to the triggering event.
4. The method of any one of the preceding embodiments, wherein determining the second subset of users of the plurality of users further comprises: comparing the first exposure vector to the exposure vectors of past triggering events to generate a measure of importance; determining a sensitivity level of the sensitive information using the measure of importance; selecting a filtering level of the plurality of users based on the sensitivity level; and filtering the plurality of users based on comparing respective entitlements for each of the plurality of users in the dataset of entitlements to the filtering level.
5. The method of any one of the preceding embodiments, wherein determining the second subset of users of the plurality of users further comprises: using the first exposure vector, determining a location of the release of the sensitive information; retrieving a location-based entitlement usage log, comprising a record of user activity for one or more users in the plurality of users; and using the location-based entitlement usage log, determining users who took part in user activities at the location.
6. The method of any one of the preceding embodiments, further comprising: for the users who took part in user activities at the location, determining a probability that said users used the entitlement corresponding to the first exposure vector; and comparing the probability to a threshold probability.
7. The method of any one of the preceding embodiments, wherein determining the second subset of users of the plurality of users further comprises: using the first exposure vector, determining a time of the release of the sensitive information; retrieving a time-based entitlement usage log, comprising a record of user activity for one or more users in the plurality of users; using the time-based entitlement usage log, determining users who took part in user activities at the time; for the users who took part in user activities at the time, determining a probability that said users used the entitlement corresponding the first exposure vector; and comparing the probability to a threshold probability.
8. The method of any one of the preceding embodiments, wherein monitoring the electronic communications of the second subset of users for activity related to the sensitive information further comprises: determining a monitoring time; comparing a current time to the monitoring time; and in response to determining that the current time corresponds to the monitoring time, processing an electronic communication of the second subset of users.
9. The method of any one of the preceding embodiments, wherein the monitoring time further comprises: comparing the first exposure vector to the exposure vectors of past triggering events to generate a measure of importance; determining a sensitivity level of the sensitive information using the measure of importance; and selecting the monitoring time based on the sensitivity level.
10. The method of any one of the preceding embodiments, further comprising: determining a severity metric of the first triggering event using the sensitivity level; and using the severity metric, determining a lockdown period for the second subset of users, wherein the lockdown period comprises a temporary restriction on certain communications and actions of the second subset of users.
11. The method of any one of the preceding embodiments, wherein detecting the first activity of the first user further comprises: retrieving a real-time activity log for the second subset of users, wherein the real-time activity log contains data for each user about recipients and contents of their communications; and matching the first exposure vector to the contents in one or more entries corresponding to the first user.
12. The method of any one of the preceding embodiments, wherein the comparison of the first exposure vector to the dataset of entitlements further comprises: retrieving a respective subset of exposure vectors for the plurality of users from the dataset of entitlements; and comparing the first exposure vector to each exposure vector in the respective subset.
13. A tangible, non-transitory, machine-readable medium storing instructions that, when executed by a data processing apparatus, cause the data processing apparatus to perform operations comprising those of any of embodiments 1-10.
14. A system comprising one or more processors; and memory storing instructions that, when executed by the processors, cause the processors to effectuate operations comprising those of any of embodiments 1-10.
15. A system comprising means for performing any of embodiments 1-10.

What is claimed is:
1. A system for automatically detecting exposures of sensitive information, the system comprising:
retrieving a dataset of entitlements for a plurality of users, wherein the dataset of entitlements specifies one or more respective exposure vectors corresponding to each of the plurality of users, wherein the dataset of entitlements specifies what locations, data, software, hardware, computer networks, or systems each user of the plurality of users has access to;
detecting a triggering event, wherein the triggering event comprises a release of sensitive information to a first subset of users of the plurality of users via a first exposure vector, wherein the first subset of users consists of users authorized to access the sensitive information; and in response to detecting the triggering event:
    determining a second subset of users of the plurality of users that have access to the first exposure vector based on a comparison of the first exposure vector to the dataset of entitlements, wherein the second subset of users consists of users not authorized to access the sensitive information;
    monitoring electronic communications of the second subset of users for activity related to the sensitive information;
    based on monitoring the electronic communications, detecting first activity of a first user of the second subset of users that is related to the sensitive information; and
    generating for display, on a user interface, a first notification to a further user based on detecting the first activity, wherein the first notification comprises a warning to the further user that the sensitive information has been released to an unauthorized user.

2. A method for automatically detecting exposures of sensitive information, the method comprising:
    retrieving a dataset of entitlements for a plurality of users, wherein the dataset of entitlements specifies one or more respective exposure vectors;
    detecting a triggering event, wherein the triggering event comprises a release of sensitive information to a first subset of users of the plurality of users via a first exposure vector; and
    in response to detecting the triggering event:
        determining a second subset of users of the plurality of users that have access to the first exposure vector based on a comparison of the first exposure vector to the dataset of entitlements;
        monitoring electronic communications of the second subset of users for activity related to the sensitive information;
        based on monitoring the electronic communications, detecting first activity of a first user of the second subset of users that is related to the sensitive information; and
        generating for display, on a user interface, a first notification to a further user based on detecting the first activity.

3. The method of claim 2, wherein:
    the dataset of entitlements specifies what locations, data, software, hardware, computer networks, or systems each user has access to; and
    exposure vectors are generated corresponding to each user in the plurality of users by correlating locations, data, software, hardware, computer networks, or systems within the entitlements of a user to potential consequences of improper usage of one or more of the locations, data, software, hardware, computer networks, or systems.

4. The method of claim 2, wherein detecting the triggering event comprises:
    receiving a second notification describing locations, data, software, hardware, computer networks, or systems which were compromised;
    receiving one or more descriptions about extent and nature of the release of sensitive information; and
    using the second notification and the one or more descriptions, generating a first exposure vector corresponding to the triggering event.

5. The method of claim 2, wherein determining the second subset of users of the plurality of users further comprises:
    comparing the first exposure vector to the exposure vectors of past triggering events to generate a measure of importance;
    determining a sensitivity level of the sensitive information using the measure of importance;
    selecting a filtering level of the plurality of users based on the sensitivity level; and
    filtering the plurality of users based on comparing respective entitlements for each of the plurality of users in the dataset of entitlements to the filtering level.

6. The method of claim 2, wherein determining the second subset of users of the plurality of users further comprises:
    using the first exposure vector, determining a location of the release of the sensitive information;
    retrieving a location-based entitlement usage log, comprising a record of user activity for one or more users of the plurality of users; and
    using the location-based entitlement usage log, determining users who took part in user activities at the location.

7. The method of claim 6, further comprising:
    for the users who took part in user activities at the location, determining a probability that said users used the entitlement corresponding to the first exposure vector; and
    comparing the probability to a threshold probability.

8. The method of claim 2, wherein determining the second subset of users of the plurality of users further comprises:
    using the first exposure vector, determining a time of the release of the sensitive information;
    retrieving a time-based entitlement usage log, comprising a record of user activity for one or more users in the plurality of users;
    using the time-based entitlement usage log, determining users who took part in user activities at the time;
    for the users who took part in user activities at the time, determining a probability that said users used the entitlement corresponding to the first exposure vector; and
    comparing the probability to a threshold probability.

9. The method of claim 2, wherein monitoring the electronic communications of the second subset of users for activity related to the sensitive information further comprises:
    determining a monitoring time;
    comparing a current time to the monitoring time; and
    in response to determining that the current time corresponds to the monitoring time, processing an electronic communication of the second subset of users.

10. The method of claim 9, wherein the monitoring time further comprises:
    comparing the first exposure vector to the exposure vectors of past triggering events to generate a measure of importance;
    determining a sensitivity level of the sensitive information using the measure of importance; and
    selecting the monitoring time based on the sensitivity level.

11. The method of claim 10, further comprising:
    determining a severity metric of the first triggering event using the sensitivity level; and
    using the severity metric, determining a lockdown period for the second subset of users, wherein the lockdown period comprises a temporary restriction on certain communications and actions of the second subset of users.

12. The method of claim 2, wherein detecting the first activity of the first user further comprises:
- retrieving a real-time activity log for the second subset of users, wherein the real-time activity log contains data for each user about recipients and contents of their communications; and
- matching the first exposure vector to the contents in one or more entries corresponding to the first user.

13. The method of claim 2, wherein the comparison of the first exposure vector to the dataset of entitlements further comprises:
- retrieving a respective subset of exposure vectors for the plurality of users from the dataset of entitlements; and
- comparing the first exposure vector to each exposure vector in the respective subset.

14. A non-transitory, computer-readable medium comprising instructions that, when executed by one or more processors, cause operations comprising:
- retrieving a dataset of entitlements for a plurality of users, wherein the dataset of entitlements specifies one or more respective exposure vectors;
- detecting a triggering event, wherein the triggering event comprises a release of sensitive information to a first subset of users of the plurality of users via a first exposure vector; and
- in response to detecting the triggering event:
  - determining a second subset of users of the plurality of users that have access to the first exposure vector based on a comparison of the first exposure vector to the dataset of entitlements;
  - monitoring electronic communications of the second subset of users for activity related to the sensitive information;
  - detecting first activity of a first user of the second subset of users that is related to the sensitive information; and
  - generating for display, on a user interface, a notification to a further user based on detecting the first activity.

15. The non-transitory, computer-readable medium of claim 14, wherein determining the second subset of users of the plurality of users further comprises:
- comparing the first exposure vector to the exposure vectors of past triggering events to generate a measure of importance;
- determining a sensitivity level of the sensitive information using the measure of importance;
- selecting a filtering level of the plurality of users based on the sensitivity level; and
- filtering the plurality of users based on comparing their entitlements in the dataset of entitlements to the filtering level.

16. The non-transitory, computer-readable medium of claim 14, wherein determining the second subset of users of the plurality of users further comprises:
- using the first exposure vector, determining a location of the release of the sensitive information;
- retrieving a location-based entitlement usage log, comprising a record of user activity for one or more users in the plurality of users; and
- using the location-based entitlement usage log, determining users who took part in user activities at the location.

17. The non-transitory, computer-readable medium of claim 16, further comprising:
- for the users who took part in user activities at the location, determining a probability that said users used the entitlement corresponding to the first exposure vector; and
- comparing the probability to a threshold probability.

18. The non-transitory, computer-readable medium of claim 14, wherein determining the second subset of users of the plurality of users further comprises:
- using the first exposure vector, determining a time of the release of the sensitive information;
- retrieving a time-based entitlement usage log, comprising a record of user activity for one or more users in the plurality of users;
- using the time-based entitlement usage log, determining users who took part in user activities at the time;
- for the users who took part in user activities at the time, determining a probability that said users used the entitlement corresponding to the first exposure vector; and
- comparing the probability to a threshold probability.

19. The non-transitory, computer-readable medium of claim 14, wherein monitoring the electronic communications of the second subset of users for activity related to the sensitive information further comprises:
- determining a monitoring time;
- comparing a current time to the monitoring time; and
- in response to determining that the current time corresponds to the monitoring time, processing an electronic communication of the second subset of users.

20. The non-transitory, computer-readable medium of claim 19, wherein the monitoring time further comprises:
- comparing the first exposure vector to the exposure vectors of past triggering events to generate a measure of importance;
- determining a sensitivity level of the sensitive information using the measure of importance; and
- selecting the monitoring time based on the sensitivity level.

* * * * *